United States Patent
Musch et al.

(10) Patent No.: US 7,947,778 B2
(45) Date of Patent: *May 24, 2011

(54) AQUEOUS DISPERSIONS

(75) Inventors: Rüdiger Musch, Gladbach (DE); Knut Panskus, Leverkusen (DE); Andreas Steinert, Langenfeld (DE)

(73) Assignee: Bayer MaterialScience AG, Leverkusen (DE)

( * ) Notice: Subject to any disclaimer, the term of this patent is extended or adjusted under 35 U.S.C. 154(b) by 524 days.

This patent is subject to a terminal disclaimer.

(21) Appl. No.: 12/069,619

(22) Filed: Feb. 12, 2008

(65) Prior Publication Data

US 2008/0214710 A1 Sep. 4, 2008

Related U.S. Application Data

(63) Continuation of application No. 11/651,636, filed on Jan. 10, 2007, now Pat. No. 7,354,971.

(30) Foreign Application Priority Data

Jan. 14, 2006 (DE) .......................... 10 2006 001942

(51) Int. Cl.
 *C08K 5/16* (2006.01)

(52) U.S. Cl. ........................................ 524/714; 526/296
(58) Field of Classification Search .................. 524/714; 526/296
See application file for complete search history.

(56) References Cited

U.S. PATENT DOCUMENTS

| | | | | |
|---|---|---|---|---|
| 2,692,250 | A * | 10/1954 | Henry | 524/236 |
| 3,869,278 | A * | 3/1975 | Wilcox | 504/173 |
| 3,903,052 | A | 9/1975 | Wagner et al. | 260/75 TN |
| 4,036,813 | A | 7/1977 | Hardman et al. | 260/46.5 G |
| 4,600,790 | A | 7/1986 | Eck et al. | 556/421 |
| 4,650,835 | A | 3/1987 | Eck et al. | 525/440 |
| 5,166,383 | A | 11/1992 | Parrinello et al. | 556/414 |
| 2002/0169255 | A1 | 11/2002 | Lagneaux et al. | 525/100 |
| 2007/0043165 | A1 * | 2/2007 | Watanabe et al. | 524/700 |

* cited by examiner

*Primary Examiner* — Ling-Siu Choi
(74) *Attorney, Agent, or Firm* — Robert S. Klemz; N. Denise Brown; Noland J. Cheung

(57) ABSTRACT

The invention concerns hydrous compositions based on polychloroprene and hydroxylamine derivatives, processes for their production and their use as adhesives. The polychloroprene dispersions are stabilized by the addition of hydroxyalkylamine after removal of residual monomer.

10 Claims, No Drawings

AQUEOUS DISPERSIONS

CROSS-REFERENCE TO RELATED APPLICATION

This application is a continuation of U.S. patent application Ser. No. 11/651,636, filed Jan. 10, 2007, now U.S. Pat. No. 7,354,971 and claims priority under 35 U.S.C. §119 (a)-(d) to German Application DE 102006001942, filed Jan. 14, 2006.

FIELD OF THE INVENTION

The invention concerns water-containing compositions, in particular aqueous polymer dispersions based on polychloroprene and hydroxylamine dervivatives, processes for their production and their use, in particular for the production of sealants and coatings, in particular for the production of adhesive coatings, and a process for bonding together the substrates coated on one or both sides with the compositions.

BACKGROUND OF THE INVENTION

Contact adhesives based on polychloroprene (CR) are predominantly solvent-containing adhesives that are applied to substrates to be bonded together and are dried. By subsequently joining the substrates together under application of pressure, a joint structure is obtained with high initial strength immediately after the joining process.

For ecological reasons there is a growing need for suitable aqueous CR adhesive dispersions that can be processed to obtain corresponding aqueous CR adhesive formulations. These are used in the spray-mix process, for example, in which the aqueous adhesive formulation and a coagulant are conveyed separately in a spray gun and finally mixed in the spray jet, whereupon the CR adhesive coagulates on the substrate. An overview of this method can be found for example in "Handbook of Adhesives", Irving Skeist, Chapman, Hall, New York, 3$^{rd}$ Edition, 1990, Part 15, page 301; R. Musch et al., Adhesives Age, January 2001, page 17, "Spray-Mixing Klebstoffe auf Basis Dispercoll® C für die Schaumstoff-Klebung", Technical Information from Bayer AG, no. KA-KR-0001d/01/05.96.

It is often necessary, however, for additives such as stabilisers and/or antioxidants, for example, to be added to the aqueous CR dispersions or formulations in order to give them an appropriate storage stability and safety in use or to protect the adhesive coatings from ageing or discoloration.

For the latter purpose aqueous formulations are advantageously mixed with zinc oxide, since in formulations based on polychloroprene dispersions it counteracts rapid ageing of the glueline and discoloration of the bonded substrates due to the release of HCl from the CR polymer.

Antioxidants are also added, preferably based on oligofunctional secondary aromatic amines or oligofunctional substituted phenols such as products of the type 6-PPD (N-(1,3-dimethylbutyl)-N'-phenyl-p-phenylene diamine; Vulkanox®, Lanxess Deutschland GmbH), DTPD, DDA, BPH, BHT, etc., as described for example in Handbuch für die Gummiindustrie, 1992 edition, Bayer AG, Leverkusen, chapter 4, Vulkanox®, p. 423. Vulkanox® DDA, a diphenylamine derivative, is particularly effective.

The zinc oxide dispersions known to date have a tendency to settle, however. This settling or phase separation is not acceptable, particularly where such adhesive formulations are used in the spray-mix process, because it causes the nozzle to clog. Cleaning the nozzle is time-consuming and cost-intensive and is unsatisfactory from an economic viewpoint.

The organic antioxidants in turn are either not resistant to discoloration (oligofunctional secondary aromatic amines) or are less effective (oligofunctional substituted phenols).

The object of the present invention was to provide novel aqueous polychloroprene dispersions and adhesive compositions which are free from residual monomer and are stable in storage and which, after application to the substrates to be bonded and joining, have a high resistance to HCl release from the polymer.

SUMMARY OF THE INVENTION

It was found that the stabilisation of aqueous polychloroprene dispersions and preparations can be improved markedly by the addition of hydroxylamine and derivatives thereof. Either hydroxylamines are added in addition to the previously used antioxidants or the conventional antioxidants are partially or wholly replaced by hydroxylamines. Hydroxylamines stabilise polychloroprene dispersions by trapping HCl, which can be released from the polychloroprene, and act as antioxidants by stopping radical reactions in the dry films produced from the aqueous preparations. An additional stabilisation can be achieved through the use of nano zinc oxide, allowing the problem of settling of zinc oxide dispersions corresponding to the current prior art to be eliminated. Furthermore, nano silicon dioxide dispersions also have a stabilising effect on resistance to HCl release and discoloration in the dry films produced from the aqueous preparations.

The present invention therefore provides a composition containing:
A) polychloroprene particles,
B) hydroxylamines having the general formula (I),

wherein
R$^1$ and R$^2$ mutually independently stand for hydrogen (H), linear or branched, saturated or unsaturated, unsubstituted, monosubstituted or polysubstituted C$_1$ to C$_{20}$ alkyl radicals or C$_6$ to C$_{12}$ aryl radicals or C$_7$ to C$_{14}$ aralkyl radicals or C$_5$ to C$_7$ cycloalkyl radicals or R$^1$ and R$^2$ are joined together by an unsubstituted, monosubstituted or polysubstituted C$_3$ to C$_7$ cycloalkyl radical
and
C) water.

The composition is in the form of an aqueous dispersion in particular.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Polychloroprene particles within the meaning of the invention are particles of polychloroprene (poly-(2-chloro-1,3-butadiene) and of copolymers containing chloroprene.

The polychloroprene (poly-(2-chloro-1,3-butadiene) particles are conveniently added to the composition according to the invention in the form of aqueous dispersions. The production of such polychloroprene dispersions is known per se and takes place by emulsion polymerisation in an alkaline aqueous medium, see "Ullmanns Encyclopädie der technischen Chemie", Volume 13, p. 614, Verlag Chemie, Weinheim, New York; 4$^{th}$ Edition 1977; "Encyclopedia of Polymer Science and Technology", Vol. 3, p. 705-730, John Wiley, New York 1965; "Methoden der Organischen Chemie" (Houben-Weyl) XIV/1, 733 ff. Georg Thieme Verlag Stuttgart 1961.

Polychloroprene dispersions that are produced by continuous polymerisation are particularly preferred, as described for example in WO 02/24825, example 2, and DE-A 3 002 734, example 6, wherein the regulator content can be varied between 0.01 wt. % and 0.5 wt. %.

Suitable copolymerisable monomers are preferably compounds having 3 to 12 C atoms and 1 or 2 copolymerisable C=C double bonds per molecule. Examples of preferred copolymerisable monomers are 2,3-dichlorobutadiene and 1-chlorobutadiene.

The polychloroprene dispersion for use in the process according to the invention is produced by emulsion polymerisation at 0 to 70° C., preferably at 5 to 45° C., and at pH values of 10 to 14, preferably pH 11 to pH 13. Activation is carried out with the conventional activators or activator systems.

The following can be cited as examples of activators or activator systems: formamidine sulfinic acid, potassium peroxodisulfate, redox systems based on potassium peroxodisulfate and optionally a silver salt, the Na salt of anthraquinone-β-sulfonic acid, wherein compounds such as e.g. formamidine sulfinic acid, the Na salt of hydroxymethane sulfinic acid, sodium sulfite and sodium dithionite serve as redox partners. Redox systems based on peroxides and hydroperoxides are also suitable. The polychloroprenes according to the invention can be produced both continuously and batchwise, continuous polymerisation being preferred.

To adjust the viscosity of the polychloroprenes according to the invention, conventional chain transfer agents can be used, such as mercaptans, as described for example in DE-A 3 002 711, GB-A 1 048 235, FR-A 2 073 106, or such as xanthogen disulfides, as described for example in DE-A 1 186 215, in DE-A 2 156 453, DE-A 2 306 610 and DE-A 3 044 811, in EP-A 0 053 319, in GB-A 512 458 and GB-A 952 156 and in U.S. Pat. No. 2,321,693 and U.S. Pat. No. 2,567,117.

The polymerisation is conventionally terminated at 50% to 95%, preferably at 60% to 80% of the monomer conversion, wherein for example phenothiazine, tert-butyl pyrocatechol or diethyl hydroxylamine can be added as inhibitors.

In the described radical emulsion polymerisation the monomer is incorporated in the polymer chain in various configurations, namely in the trans-1,4 and cis-1,4 position, in the 1,2 position and in the 3,4 position, see: "W. Obrecht in Houben-Weyl: Methoden der organischen Chemie Vol. 20 Part 3 Makromolekulare Stoffe (1987) p. 845", the monomer incorporated in the 1,2 position containing an unstable, easily separable chlorine atom that is responsible for HCl release from the polymer.

Following polymerisation the remaining monomeric chloroprene is removed by steam distillation and a residual monomer-free dispersion is produced. Steam distillation is performed as described for example in "W. Obrecht in Houben-Weyl: Methoden der organischen Chemie Vol. 20 Part 3 Makromolekulare Stoffe (1987) p. 852". Through repeated steam distillation, the content of monomeric chloroprene in the polymer can be reduced to values of around 100 ppm, preferably 50 ppm or less. Such dispersions are classed as residual monomer-free dispersions within the meaning of the present invention. During this process, however, the stopper diethyl hydroxylamine still present in the dispersion from the polymerisation stage is removed, such that its content in the latex is below the detection limit of >1 ppm.

The use of hydroxylamines as polymerisation inhibitors, i.e. to stop polymerisation, either alone or in combination with other stoppers, is described for example in "Methoden der Organischen Chemie" (Houben-Weyl) XIV/1, p. 435, 441, 746 ff. Georg Thieme Verlag Stuttgart 1961.

The effectiveness of certain hydroxylamines in suppressing the phenomenon known as popcorn formation during polymerisation is also described.

The stabilising effect according to the invention is no longer present in the finished, residual monomer-free polymer dispersion, however, because—as mentioned above— the described hydroxylamines are removed along with the residual monomer, which for toxicological reasons is removed from the latex obtained immediately after the end of polymerisation, by steam distillation for example.

The solids content of this low-monomer polychloroprene dispersion can be increased if necessary in a further step by means of a concentration step (creaming process). This creaming takes place for example by the addition of alginates, as described in "Neoprene Latices, John C. Carl, E.I. Du Pont 1964, p. 13", or by means of a creaming process using a coalescing agent, as described in DE-A 10 145 097, which is particularly preferred.

In a preferred embodiment of the invention, the polychloroprene particles have an average primary particle diameter of less than 220 nm.

Analogous to DIN 53206; 1992-08, the term "primary particle" denotes particles that are detectable as individuals by means of suitable physical methods. It is possible to speak of "diameters" in connection with the polychloroprene particles as the particles are approximately spherical.

The average primary particle diameter of the polychloroprene particles is preferably determined according to the invention by means of ultracentrifuging, see: H. G. Müller, Progr. Colloid Polym. Sci. 107, 180-188 (1997). The weight average is stated.

An average primary particle diameter of more than 220 nm can be disadvantageous, because undesirable sedimentation can occur during removal of the residual monomer 2-chloro-1,3-butadiene from the polychloroprene dispersion by steam distillation.

In a further preferred embodiment of the invention, the polychloroprene particles have an average primary particle diameter of more than 60 nm.

An average primary particle size of less than 60 nm can be disadvantageous, because a concentration of the polymer dispersion to a solids content of >55 wt. % is no longer possible. Thus the concentration of e.g. styrene butadiene (SBR) latex having a particle size of 78 nm with ammonium alginate is no longer possible (Ind. Eng. Chem. 43, 407 (1951)).

The polychloroprene particles preferably have an average primary particle diameter of 60 to 220 nm, preferably 70 to 160 nm.

The cited average primary particle diameters of the polychloroprene particles are present both in the aqueous dispersions used to produce the compositions according to the invention and in the compositions according to the invention that are obtained.

The production of the hydroxylamines for use according to the invention is known and is described for example in "Methoden der Organischen Chemie" (Houben-Weyl) X/1, p. 1097-1279. Georg Thieme Verlag Stuttgart 1971.

They correspond to the general formula (I)

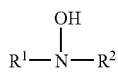

wherein
$R^1$ and $R^2$ mutually independently stand for hydrogen (H), linear or branched, saturated or unsaturated, unsubstituted, monosubstituted or polysubstituted $C_1$ to $C_{20}$ alkyl radicals or $C_6$ to $C_{12}$ aryl radicals or $C_7$ to $C_{14}$ aralkyl radicals or $C_5$ to $C_7$ cycloalkyl radicals or $R^1$ and $R^2$ are joined together by an unsubstituted, monosubstituted or polysubstituted $C_3$ to $C_7$ cycloalkyl radical.

Suitable hydroxylamines include, for example, aliphatic and aromatic hydroxylamines, including those that are N- and O-substituted. Preferred are aliphatic and aromatic low molecular weight hydroxylamines, which are N-substituted. Especially preferred are N,N-Diethyl hydroxylamine, N-isopropyl hydroxylamine, N,N-Dibenzylhydroxylamine, N,N-dibutylhydroxylamine, and N-tertbutyl hydroxylamine according to the invention.

According to the invention the hydroxylamines are added to the finished polychloroprene dispersion alone or in combination with other auxiliary substances. The amount to be used depends on the nature of the polychloroprene dispersion to be protected against ageing and on the desired intensity of the protective effect and can easily be determined by the person skilled in the art in this field by means of preliminary exploratory tests. The hydroxylamines are generally added in a concentration of 0.05 to 2 wt. %, preferably 0.1 to 1 wt. %, based on solids. The addition can be made at any time, preferably immediately after production (polymerisation) of the dispersion, or as a post-additive to a finished formulation.

The compositions according to the invention can additionally contain nano zinc oxide particles (D1) whose average particle size is less than 150 nm, preferably less than 100 nm, particularly preferably less than 50 nm. As the nano zinc oxide particles are not spherical, it is more accurate to speak of average particle size rather than average particle diameter.

The nano zinc oxide particles (D1) can be present in the compositions according to the invention both as primary particles and in the form of agglomerates. According to the invention the term "average particle size of the ZnO particles" denotes the average particle size determined by ultracentrifuging and includes the size of primary particles and of any agglomerates that may be present (see: H. G. Müller, Progr. Colloid Polym. Sci. 107, 180-188 (1997)). The weight average is specified.

The nano zinc oxide particles are conveniently added to the compositions according to the invention in the form of aqueous ZnO dispersions. These aqueous dispersions can additionally contain organic high-boiling solvents such as triethanolamine or ethylene glycol and/or surface-modifying compounds. The ZnO particles can consist of either non-agglomerated ZnO primary particles or ZnO agglomerates or of mixtures of dispersed ZnO primary particles and ZnO agglomerates, whose dimensions can be as described above.

The aqueous dispersions of zinc oxide preferably used in the present invention to produce the compositions according to the invention can be produced in various ways. Particularly suitable, however, are processes in which the zinc oxide particles are produced by precipitation from a zinc salt solution with alkali and are then processed further to form a dispersion. Suitable examples are:

I) a zinc oxide sol as described for example in WO 00/50503, produced by redispersion of zinc oxide gels having an average primary particle size of <15 nm. Water or water/ethylene glycol mixtures are suitable as solvents, optionally with the addition of surface-modifying compounds or II) zinc oxide sols as described for example in WO 02/083797 having an average primary particle size of <30 nm and an average agglomerate size of <100 nm, produced for example by the process described in WO 02/083797.

Just as suitable for producing the compositions according to the invention are ZnO dispersions produced with surface-modified zinc oxides, as described for example in DE-A 10 163 256, for example by one of the processes described therein.

In a preferred embodiment of the invention, the compositions according to the invention contain further additives, such as in particular silicon dioxide particles (D2). The silicon dioxide particles in combination with zinc oxide lead to an increase in the viscosity of the adhesive dispersion. The combined use of nano zinc oxide (D1) and silicon dioxide (D2) dispersions is particularly preferred.

The average silicon dioxide particle size or the average diameter of the silicon dioxide particles (the particles are approximately spherical), determined by ultracentrifuging (as specified above), is preferably in the range from 1 to 400 nm, more preferably in the range from 5 to 100 nm, particularly preferably in the range from 8 to 50 nm. The average silicon dioxide particle diameter includes the particle diameter of the primary particles and of any agglomerates that may be present.

The silicon dioxide particles are preferably added to the compositions according to the invention in the form of aqueous silicon dioxide dispersions having an average particle diameter of the $SiO_2$ particles of 1 to 400 nm, preferably 5 to 100 nm, particularly preferably 8 to 50 mm.

The cited aqueous silicon dioxide dispersions are particularly preferably added to the compositions according to the invention in the form of hydrous silica sols. The particle sizes of the silica sols used are not subject to any substantial change during incorporation into the compositions according to the invention.

Silicon dioxide dispersions that are suitable according to the invention can be obtained on the basis of silica sol, silica gel, pyrogenic silicas or precipitated silicas or mixtures of those cited and are described in DE-A 10 224 898.

It is likewise preferable for the $SiO_2$ particles to have hydroxyl groups on the particle surface. Aqueous silica sols are particularly preferably used as aqueous silicon dioxide dispersions.

In a further preferred embodiment of the invention, the compositions according to the invention contain at least one antioxidant that differs from the ZnO particles described above. The antioxidant is preferably based on oligofunctional secondary aromatic amines (D3) and/or oligofunctional substituted phenols (D4), such as products of the type 6-PPD, DTPD, DDA, BPH, BHT, etc., as described for example in Handbuch für die Gummiindustrie, 1992 edition, Bayer AG, Leverkusen, chapter 4: Vulkanox®, p. 423. Vulkanox® DDA, a diphenylamine derivative, is particularly effective.

For the production of adhesives having optimum resistance to HCl release, preferably 0.1 to 10 wt. %, more preferably 0.2 to 3 wt. % of an antioxidant, preferably based on oligofunctional secondary aromatic amines (D3) or oligofunctional substituted phenols (D4), can be added, alone or in combination with 2 wt. % to 30 wt. % of a silica sol dispersion (D2).

The composition according to the invention can additionally contain 0 to 79.99 wt. % of further conventional adhesive auxiliary substances and additives (E).

These are understood to be, for example, other polymers, such as e.g. polyacrylates, polyvinylidene chloride, polybutadiene, polyvinyl acetate and/or styrene-butadiene rubbers, which can preferably be added in the form of aqueous dispersions in a proportion of up to 30 wt. %, based on the solids content of the composition. Such polymers can be used to modify the properties of the adhesive compositions.

Further examples of adhesive auxiliary substances and additives (E) are, for example, fillers, such as silica flour, silica sand, barytes, calcium carbonate, chalk, dolomite or talc, optionally together with wetting agents, for example polyphosphates such as sodium hexametaphosphate, naphthalene sulfonic acid, ammonium or sodium polyacrylic acid salts, the fillers being added in quantities of preferably up to 75 wt. %, more preferably 10 to 60 wt. %, even more preferably 20 to 50 wt. %, and the wetting agents in quantities of 0.2 to 0.6 wt. %, all figures being based on the solids content of the composition.

The amount of fillers added depends inter alia on whether the compositions according to the invention are used as an adhesive or sealant. For use as an adhesive, maximum filler contents of around 30 to 40 wt. % are preferred, based on the solids content of the composition. A content of polychloroprene particles of more than 40 wt. % is preferred in this case.

For use as a sealant, maximum filler contents of around 60 to 75 wt. % are preferred, based on the solids content of the composition. A content of polychloroprene particles of less than 40 wt. % is preferred in this case.

Further suitable auxiliary substances are, for example, organic thickeners, such as cellulose derivatives, alginates, starch, starch derivatives, polyurethane thickeners or polyacrylic acid, for use in quantities of around 0.01 to 1 wt. % based on the solids content, or inorganic thickeners, such as bentonite for example, for use in quantities of 0.05 to 5 wt. % based on the solids content.

For preservation purposes, fungicides can also be added to the adhesive composition according to the invention. These are used in quantities of 0.02 to 1 wt. %, for example, based on non-volatile components. Suitable fungicides are for example phenol and cresol derivatives or organotin compounds.

Tackifying resins, such as e.g. unmodified or modified natural resins such as colophony esters, hydrocarbon resins or synthetic resins such as phthalate resins can optionally also be added in dispersed form to the polymer dispersion according to the invention (see e.g. "Klebharze" R. Jordan, R. Hinterwaldner, p. 75-115, Hinterwaldner Verlag Munich 1994). Alkyl phenolic resin and terpene phenolic resin dispersions with softening points greater than 70° C., particularly preferably greater than 110° C., are preferred.

Plasticisers, such as those based on adipates, phthalates or phosphates for example, can also be added, for example in quantities of 0.5 to 10 wt. % based on the solids content.

Based on the overall weight of the composition, the solids content of the composition according to the invention is preferably at least around 50 wt. %, more preferably at least around 60 wt. %, even more preferably more than 70 wt. %, corresponding to a content of volatile components in the composition according to the invention of preferably less than around 50 wt. %, more preferably less than around 40 wt. %, even more preferably less than around 30 wt. %.

Organic solvents, such as e.g. toluene, xylene, butyl acetate, methyl ethyl ketone, ethyl acetate, dioxane, triethanolamine, ethylene glycol or mixtures thereof can be included according to the invention in the composition. The organic solvents can be added to the water-containing compositions according to the invention in small quantities of at most around 50 wt. %, based on the total amount of volatile components. They serve to improve adhesion to substrates that are difficult to bond, for example.

To produce the compositions according to the invention, aqueous dispersions of components A), B) and optionally D1), D2), D3), D4) and E) are conveniently mixed together in the following proportions:

| | |
|---|---|
| polychloroprene dispersion (A) | 50 to 99.95 wt. % |
| hydroxylamine (B) | 0.05 to 2 wt. % |
| zinc oxide dispersion (D1) | 0 to 10 wt. %. |
| silicon dioxide dispersion (D2) | 0 to 40 wt. % |
| at least one antioxidant differing from zinc oxide (D3, D4) | 0 to 10 wt. % |
| other conventional adhesive auxiliary substances and additives (E) | 0 to 79.95 wt. % | the stated percentages by weight referring in each case to the solids content of the composition, which adds up to 100%. (Unless otherwise specified, the weights given below also relate to the solids content). The solids content denotes in this context the weight of non-volatile components, such as in particular polychloroprene, ZnO and $SiO_2$. The volatile components include in particular also the high-boiling solvents, which can be removed by distillation at up to 250°/15 torr. The solids content adds up to 100 wt. %. In addition, the antioxidant (D1) can be added in amounts of preferably 0 to 10 wt. %, preferably 0 to 3 wt. %, based on the solids content of the composition.

The invention also provides a process for producing the compositions according to the invention, characterised in that a hydrous polychloroprene dispersion (A) is mixed with a hydrous hydroxylamine dispersion (B) or a water-soluble hydroxylamine, and a zinc oxide dispersion (D1) and/or a silicon dioxide dispersion (D2) and/or antioxidants (D3, D4) are optionally added and optionally further conventional adhesive auxiliary substances and additives (E) are also added.

The compositions according to the invention can be used as adhesives or as sealants. Use as an adhesive is preferred.

The present invention therefore also provides the use of the hydroxylamine-containing polymer dispersions to produce adhesive formulations, the adhesive formulations obtained in this way themselves, substrates coated with them and the polymer coatings obtained from the polymer dispersions, and the substrates bonded together by means of these coatings.

According to DIN 16920, an adhesive is a non-metallic substance that can bond together adherends by surface bonding (adhesion) and inner strength (cohesion).

Adhesive formulations according to the invention can be applied in known ways, for example by spreading, pouring, knife application, spraying, roller application or dipping. The adhesive film can be dried at room temperature or at elevated temperature.

Application is preferably by means of the spray process, as described for example in EP-A 0 624 634.

The adhesives according to the invention are used for example for bonding any substrates of like or unlike nature, such as wood, paper, plastics, textiles, leather, rubber or inorganic materials such as ceramics, earthenware, fibreglass or cement, but also for impregnating, coating and laminating fabric and paper, as a binder for fibres or to reinforce toe caps on shoes and as an insulating material.

EXAMPLES

A Substances Used

TABLE 1

| Polychloroprene dispersion | | |
|---|---|---|
| Dispersion | Polychloroprene type | Manufacturer |
| Dispercoll ® C 84 | pH 12, highly crystallising, gel-free, solids content 55 +/− 0.5% Chloroprene homopolymer | Bayer Material Science AG, DE |

The average particle diameter of the polychloroprene particles was 95 nm.

TABLE 2

| N,N-Diethyl hydroxylamine (DEHA) | | |
|---|---|---|
| Product | Supplier | Delivery form |
| N,N-Diethyl hydroxylamine | Borchers GmbH, Langenfeld, DE | Aqueous solution, 85% |

TABLE 3

| Additives and auxiliary substances | | | |
|---|---|---|---|
| Product | Solids content | Function | Manufacturer |
| Borchers ® VP 9802 (zinc oxide dispersion not according to the invention) | 50% | Stabiliser | Borchers GmbH, Langenfeld, DE |
| Rhenofit ® DDA-50 EM (diphenylamine derivative dispersion) | 50% | Antioxidant | Rhein Chemie GmbH, Mannheim, DE |
| Nano zinc oxide dispersion A (see below) | Zinc oxide 15% | Stabiliser | Bayer AG, DE |
| Dispercoll ® S 3030 silica sol | 30% | Stabiliser | Bayer AG, DE |
| Dermulsene ® TR 93 (terpene phenolic resin dispersion) | 50% | Resin | DRT, Cedex, FR |

Borchers® VP 9802:

Aqueous zinc oxide dispersion with a particle size of 50,000 to 150,000 nm.

Dispercoll® S 3030:

Silica gel with a specific surface area of 300 ($m^2$/g) and an average particle diameter of approx. 9 nm.

B Production of the Nano Zinc Oxide Dispersion A Used

The nano zinc oxide dispersion A is produced by the process described in WO 00/50503 (example 1: production of a zinc oxide gel in methanol from zinc acetate dihydrate). Production of the zinc oxide sol from the zinc oxide gel takes place in an analogous manner to example 7 in this publication, the zinc oxide gel being mixed only with water and triethanolamine and the methanol component being drawn off under vacuum, such that a nano zinc oxide dispersion in triethanol/water is obtained. The average primary particle size is 10.5 nm (number average), the zinc oxide content 15%.

C Measurement Techniques

C1: Determination of Thermal Stability (HCl Stability)

The dried adhesive specimens are tested in accordance with DIN 53381, method B.

Method of Measuring:

Measuring instrument: 763 PVC Thermomat supplied by Metrohm, CH-9101 Herisau, Switzerland The specimens (thickness 0.1 to 1 mm) are cut to an edge length of approx. 2 to 3 mm, 0.2 g are weighed into a test tube and the measurement is performed at 180° C. with air as the carrier gas. The electrical resistance of water, in which the HCl gas that is formed dissolves again, is measured. The time at which the electrical resistance reaches the value of 50 µS/cm is stated as the HCl stability. The higher the value, the more stable the measured specimen with regard to HCl release.

D Results

D1: Determination of Storage Stability (Change in pH)

2 g of diethyl hydroxylamine are added to 100 g of polychloroprene dispersion whilst stirring and the dispersion is stored at 60° C. After a storage period of 7 and 14 days the pH is determined.

TABLE 4

| Stabilisation of pH | | | |
|---|---|---|---|
| No. | 1 | 2*) | Solids content in wt. %[1)] |
| Dispercoll ® C 84 | 100 | 100 | 55 |
| Diethyl hydroxylamine | — | 5 | 20 |
| pH of dispersion: | | | |
| Immediately | 13.3 | 13.3 | |
| After 7 days at 60° C. | 9.9 | 10.9 | |
| After 14 days at 60° C. | 9.4 | 10.3 | |

*)Example according to the invention
[1)]Parts by weight of dispersion

D2: Thermal Stability of a Formulation Using Various Zinc Oxide Dispersions and Replacing the Antioxidant Rhenofit® DDA with DEHA

TABLE 5

| | HCl stability of dispersions | | | | |
|---|---|---|---|---|---|
| No. | 3 | 4 *) | 5 | 6 *) | Solids content [1] |
| Dispercoll ® C 84 | 1000 | 1000 | 1000 | 1000 | 55 wt. % |
| Rhenofit ® DDA 50 EM | 20 | | 20 | | 50 wt. % |
| Borchers ® VP 9802 | 5.3 | 5.3 | | | 50 wt. % |
| Nano zinc oxide A | — | | 1.7 | 1.7 | 15 wt. % |
| DEHA | | 50 | | 50 | 20 wt. % |
| Dermulsene ® TR 93 | 300 | 300 | 300 | 300 | 50 wt. % |
| HCl stability in minutes | 40 | 385 | 85 | 350 | |

([1] Parts by weight of dispersion)

D3: Influence of N,N-diethyl Hydroxylamine (DEHA) and Nano Silicon Dioxide on the HCl Stability of Dispercoll® C Formulations

TABLE 6

| | HCl stability of dispersions | | | | | | | | |
|---|---|---|---|---|---|---|---|---|---|
| No. | 7 | 8 | 9 | 10 | 11*) | 12*) | 13*) | 14*) | Solids content[1] (wt. %) |
| Dispercoll ® C 84 | 182.6 | 182.6 | 182.6 | 182.6 | 182.6 | 182.6 | 182.6 | 182.6 | 58 |
| DEHA | — | — | — | — | 5.0 | 5.0 | 5.0 | 5.0 | 20 |
| Dispercoll ® S3030 | — | 87.8 | — | 87.8 | — | 87.8 | — | 87.8 | 30 |
| Rhenofit ® DDA | 2.9 | 2.9 | 2.9 | 2.9 | 2.9 | 2.9 | 2.9 | 2.9 | 50 |
| Nano ZnO**) | — | — | 24 | 24 | — | — | 24 | 24 | 15 |
| HCl stab, (min) | 87 | 240 | 520 | 380 | 105 | 270 | 590 | 693 | |

*)Example according to the invention
**)Based on zinc oxide content
([1]Parts by weight of dispersion)

Formulations 7 to 10 correspond to formulations 11 to 14, except that the latter contain a hydroxylamine derivative according to the invention. If formulation 7 is compared with 11, 8 with 12, 9 with 13 and 10 with 14, it can be seen in all comparisons that in the case of the formulations containing hydroxylamine, HCl development is significantly delayed, i.e. the addition of the hydroxylamine derivative has a stabilising effect.

The invention claimed is:

1. Aqueous polymer dispersion free from residual monomer and comprising:
   A) polychloroprene particles and
   B) hydroxylamine derivatives having the general formula (I)

in which the radicals
$R^1$ and $R^2$ each independently stand for hydrogen (H), linear or branched, saturated or unsaturated, unsubstituted, monosubstituted or polysubstituted $C_1$ to $C_{20}$ alkyl radicals or $C_6$ to $C_{12}$ aryl radicals or $C_7$ to $C_{14}$ aralkyl radicals or $C_5$ to $C_7$ cycloalkyl radicals and $R^1$ and $R^2$ are optionally joined together by an unsubstituted, monosubstituted or polysubstituted $C_3$ to $C_7$ cycloalkyl radical.

2. Aqueous polymer dispersion according to claim 1, containing 0.05 to 2 wt. %, based on the solids content of the dispersion, of hydroxylamine derivatives (B).

3. Aqueous polymer dispersion according to claim 1, containing 0.1 to 1.0 wt. %, based on the solids content of the dispersion, of hydroxylamine derivatives (B).

4. Aqueous polymer dispersion according to claim 1, wherein N,N-diethyl hydroxylamine and/or N-isopropyl hydroxylamine are used as the hydroxylamine derivatives (B).

5. Adhesive and sealant formulations containing aqueous polymer dispersions according to claim 1.

6. Substrates coated with adhesive formulations according to claim 5.

7. Polymer coatings obtained from aqueous polymer dispersions according to claim 1.

8. Substrates bonded together with coatings according to claim 7.

9. A process for preparing an aqueous polychloroprene dispersion comprising the steps of 1) polymerizing monomeric polychloroprene; 2) removing residual monomers and other volatile constituents by distillation; and 3) adding a hydroxyalkylamine of formula (I):

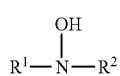 (I)

in which the radicals

R¹ and R² each independently stand for hydrogen (H), linear or branched, saturated or unsaturated, unsubstituted, monosubstituted or polysubstituted $C_1$ to $C_{20}$ alkyl radicals or $C_6$ to $C_{12}$ aryl radicals or $C_7$ to $C_{14}$ aralkyl radicals or $C_5$ to $C_7$ cycloalkyl radicals or R¹ and R² are joined together by an unsubstituted, monosubstituted or polysubstituted $C_3$ to $C_7$ cycloalkyl radical.

10. A method of stabilizing an aqueous polychloroprene dispersion comprising the step of adding a hydroxyalkylamine of formula (I):

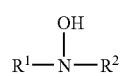 (I)

in which the radicals

R¹ and R² each independently stand for hydrogen (H), linear or branched, saturated or unsaturated, unsubstituted, monosubstituted or polysubstituted $C_1$ to $C_{20}$ alkyl radicals or $C_6$ to $C_{12}$ aryl radicals or $C_7$ to $C_{14}$ aralkyl radicals or $C_5$ to $C_7$ cycloalkyl radicals or R¹ and R² are joined together by an unsubstituted, monosubstituted or polysubstituted $C_3$ to $C_7$ cycloalkyl radical, after creation of the dispersion and removal of the residual monomer.

* * * * *